Feb. 5, 1952 — A. S. FITZ GERALD — 2,584,856
ELECTROMAGNETIC SYSTEM
Filed Dec. 31, 1946 — 4 Sheets-Sheet 1

INVENTOR
ALAN S. FITZGERALD
ATTORNEYS

Feb. 5, 1952 A. S. FITZ GERALD 2,584,856
ELECTROMAGNETIC SYSTEM
Filed Dec. 31, 1946 4 Sheets-Sheet 3

INVENTOR
ALAN S. FITZGERALD
BY
ATTORNEYS

Patented Feb. 5, 1952

2,584,856

UNITED STATES PATENT OFFICE 2,584,856

ELECTROMAGNETIC SYSTEM

Alan S. Fitz Gerald, Wynnewood, Pa., assignor to Warren Webster & Company, Camden, N. J., a corporation of New Jersey Application December 31, 1946, Serial No. 719,445

12 Claims. (Cl. 323—89)

This invention relates to magnetic amplifying systems of the type which employ saturating reactors, and more particularly to systems of the above type which respond selectively in accordance with the polarity of a direct current input signal.

The present invention constitutes an improvement on that forming the subject matter of my co-pending U. S. application, Serial No. 666,867, filed May 3, 1946, now Patent No. 2,461,046. In this earlier application, I have disclosed a magnetic amplifier system primarily intended for furnishing an electrical output to operate a single electro-responsive device such as a relay or the like, that is to say, a simple single action device which will, for example, close a contact when energized and open it when deenergized.

The more important electrical control systems, in connection with which there is a requirement for sensitive amplifying or responsive devices capable of operation with inputs of very low power level, are of the type represented by automatic self-balancing bridges, servo-mechanism circuits, and automatic regulating or similar systems having a normal condition of balance or stability from which deviations are possible in more than one sense; as for example, high or low, fast or slow, leading or lagging.

In such arrangements, the sensitive device must be responsive selectively in accordance with the sense of the unbalance or deviation, and the output delivered must be of the form permitting action in either of two corrective directions as well as a continued state of inaction as long as the normal or balanced condition of the automatic regulation is maintained. For example, the output must be capable of operating a motor selectively in either of the two directions or of causing the motor to remain at rest; or it must actuate a relay or control device of the so called three-position type capable of closing one or other of two contacts or causing both contacts to remain open.

It is accordingly an object of my invention to provide an improved magnetic amplifier system of the polarized type capable of furnishing an output selectively variable in accordance with the polarity of the input signal.

In polarized type magnetic amplifiers of the prior art duplicate arrangements are shown of two magnetic amplifiers each of which furnish output currents when no input is applied to the saturating windings. Input saturating current is applied, in opposite sense, to the input windings of the two duplicate magnetic amplifiers, whereby the output current of one is increased and the output current of the other is decreased by application to the input windings of saturating current of a given polarity. Means, mechanical or electrical, are provided for actuating a work-device in accordance with the difference between the output current of the two magnetic amplifiers.

In other words, the output of one magnetic amplifier is balanced against the output of the other and the work-device is operated by the out-of-balance effect.

In devices of the above described form, where a high order of sensitivity is required, it follows that the out-of-balance current represents a very small percentage of the magnitude of the two currents which are balanced. Thus, the utility of arrangements of this nature is limited mostly by questions of stability; that is to say, the extent to which small differences between the two balanced currents, of an order of magnitude comparable to that which may be produced by an input current, can arise from causes other than an input signal.

In practice it has been found that such differences can readily arise due to differences between different rectifiers, or different high permeability magnetic cores, and especially as a result of fluctuations in the alternating current supply voltage, temperature effects, and the like.

In other words, the condition of perfect balance or zero adjustment of such high-sensitivity amplifiers is subject to drift or deviation as a result of any change that takes place in one portion of a magnetic amplifier of this type which is not exactly counter-balanced by a precisely congruent change in the other portion. Such amplifiers therefore are subject to the limitations, well understood by those skilled in the art, which apply to all devices based upon the principle of detecting small differences between two relatively large quantities.

It is therefore another object of my invention to provide an improved polarized-type magnetic amplifier in which the zero or null position is more positive and stable than arrangements of the prior art, in that it is not primarily a function of a balance between relatively large outputs of a pair of magnetic amplifiers.

These and other novel features which I believe to be characteristic of my invention will be set forth with particularity in the appended claims. My invention itself, however, both as to its organization and method of operation, together with further objects and advantages thereof, may best be understood with reference to the following description taken in connection with the accompanying drawings, in which:

Fig. 5 is a fragmentary portion of the Figure 1 circuit illustrating a modified form of my invention;

Figure 1:
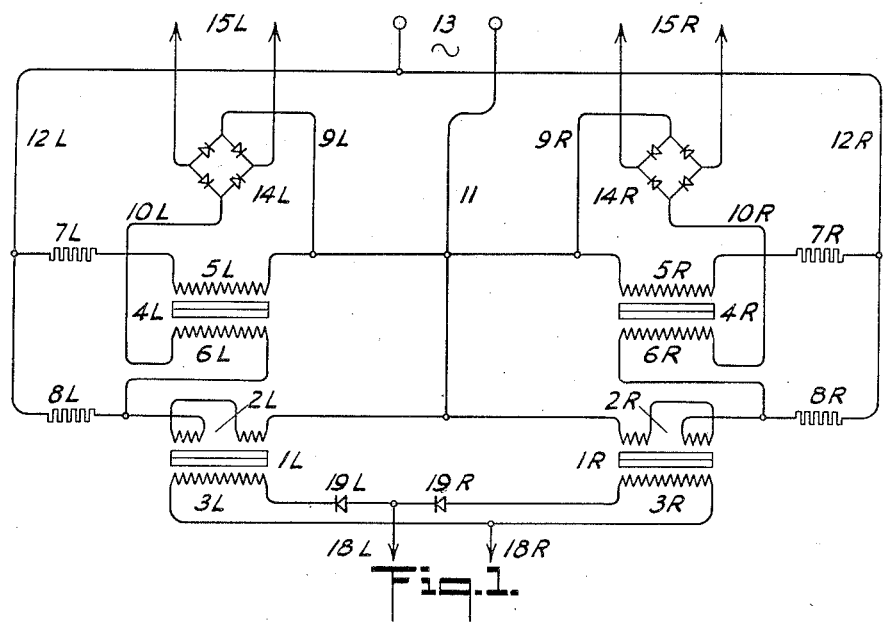
Fig. 1 is an electrical circuit diagram showing a single stage of a magnetic amplifier in accordance with an embodiment of my invention.

Referring to the drawing, I show in Fig. 1 a magnetic amplifier circuit comprising a duplicate arrangement of the circuit shown in Fig. 1 of my above cited co-pending application, in which I have used like numerals to identify the core 1 of the saturating reactor, the A. C. winding 2, the saturating winding 3, together with the core 4, the primary winding 5, and the secondary winding 6 of the transformer. I show also resistances 7 and 8, conductors 9, 10, and 11, 12, rectifiers 14, and output circuits 15. In view of the fact that all of these elements occur in duplicate, I have identified all those comprising the left hand portion of the circuit by the suffix L, and those in the right hand portion of the circuit by the suffix R.

I show also an alternating current source at 13 from which both of the above described magnetic amplifiers are energized in parallel.

In Fig. 1, I show leads 18L, 18R, for receiving input energization, and arranged to supply the input windings 3L, 3R, in parallel, through two half-wave contact rectifiers, 19L, 19R, connected in opposite sense so that when the input is applied such that 18L is positive and 18R is negative, current is conducted by 19L to energize 3L. Under this condition 19R does not conduct and 3R is not energized. The right hand section of the circuit is therefore completely inert, and no output is delivered to the right hand output circuit 15R. The left hand output circuit 15L is, however, energized commensurately with the input signal.

If the polarity of input signal is reversed so as to make 18R positive and 18L negative, the opposite effect results; output circuit 15R is energized whereas no current is supplied to the output circuit 15L.

It will be obvious to those skilled in the art that according to this arrangement the zero point of the system is entirely independent of the characteristics of the rectifiers 14L and 14R and is likewise independent of changes in the electrical characteristics of any of the other circuit elements, such as the saturating reactors, transformers, or resistances. The zero point is directly related to the change of polarity of the input, in accordance with the action of 19L and 19R.

It is well known to those skilled in the art that the polarity-selective properties of contact rectifiers are associated with marked non-linear characteristics, and that such devices are substantially non-conducting, in either direction, at very low voltages. The arrangement shown in Fig. 1 is in general practical and useful when the input power is delivered from a circuit of relatively high resistance, to which value the resistance of 3L and 3R are properly commensurate, such that the minimum signal voltage is not less than say, 100 millivolts. These conditions result, in practice, in a limitation that the arrangement shown in Fig. 1 tends to be inapplicable for input power levels very much less than 10 microwatts.

Magnetic amplifiers, may, very readily be furnished for power levels substantially less than the above mentioned figure.

Figure 2:
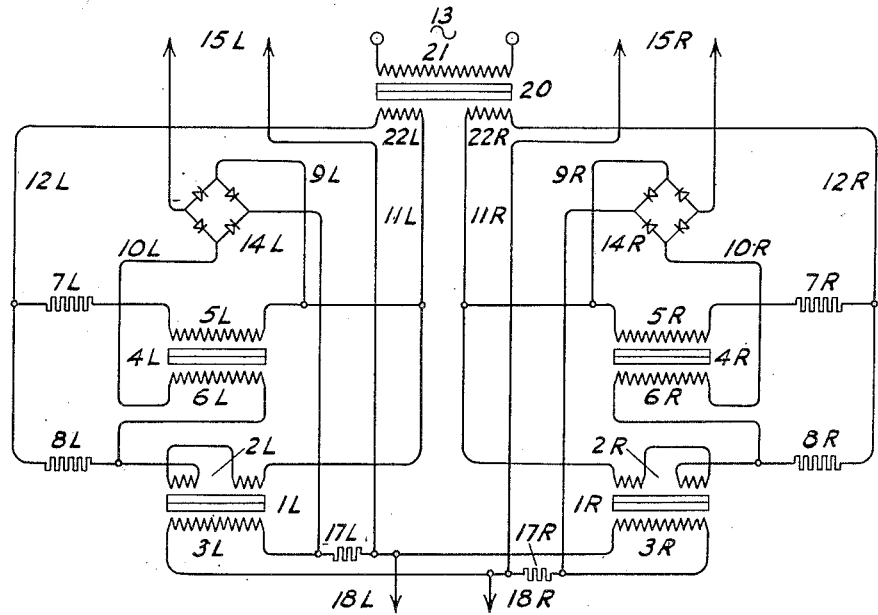
Fig. 2 is an electrical circuit diagram showing a more sensitive form of magnetic amplifier in accordance with another embodiment of my invention.

I show, therefore, in Fig. 2 an improved arrangement operating upon a principle similar to that shown in Fig. 1, but not subject to the above limitation.

In Fig. 2, I show the two duplicate magnetic amplifier systems comprising saturating reactors, transformers, and resistance, together with their respective output circuits all as shown in Fig. 1.

In Fig. 2, however, I obtain selective input to the D. C. saturating windings, in accordance with the polarity of the input signal, by the use of a regenerative or feed-back arrangement.

Figure 8:
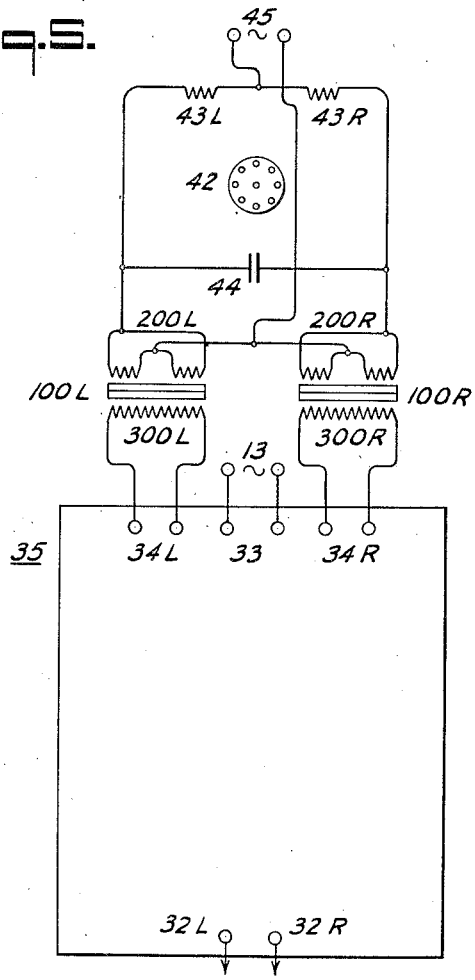
Figure 6:
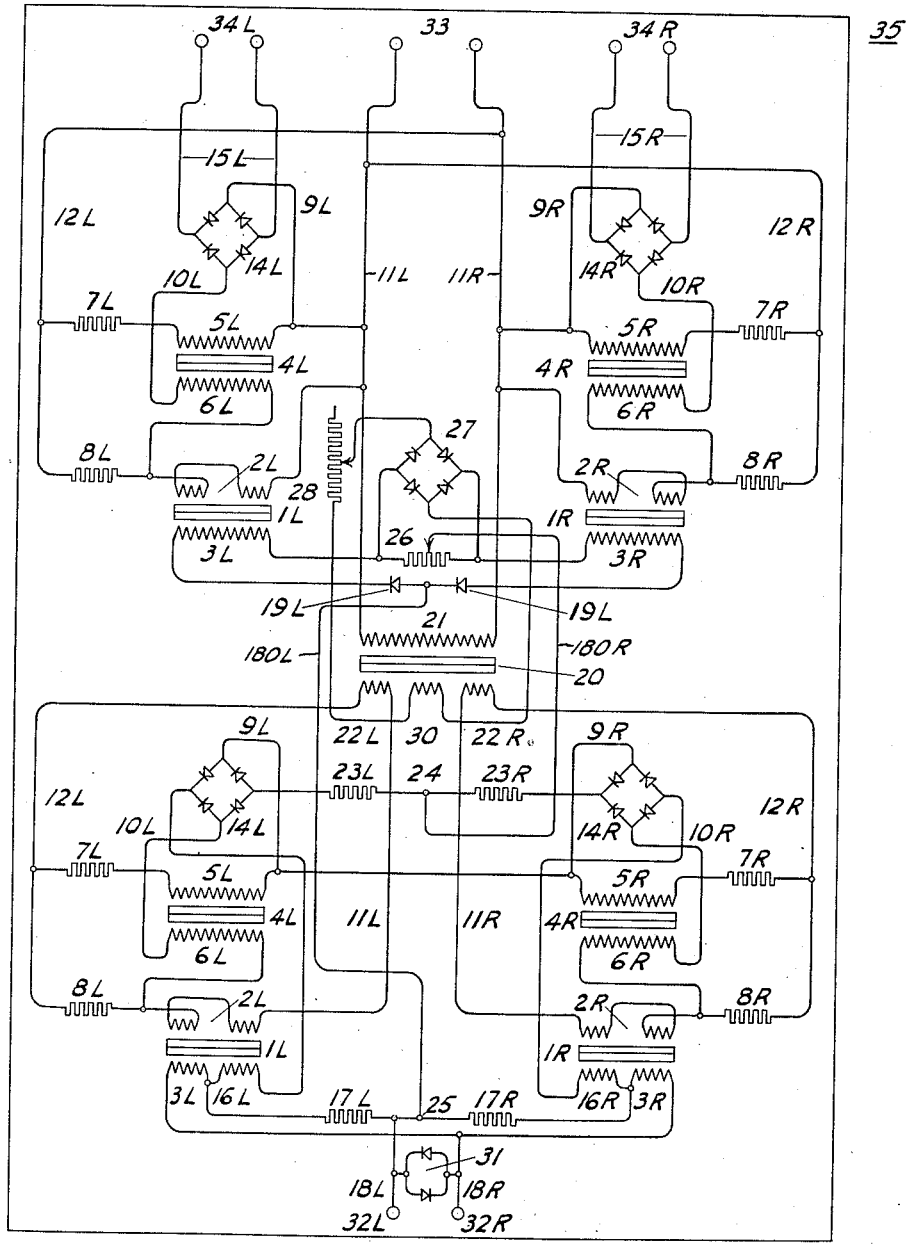

In Fig. 2, I employ the feed-back connections which I have disclosed in Fig. 8 of my above cited co-pending application.

It will be seen that in Fig. 2 of the present application I show resistances 17L and 17R connected in series with the input windings 3L, 3R, and also connected to receive the direct current delivered by the rectifiers 14L, 14R, to the output circuits 15L, 15R.

I have, however, arranged the connections to 17L and 17R so that the feed-back is positive in respect of the left hand section of the magnetic amplifier when it is negative in respect of the right hand section; and vice-versa.

Because of the necessary interconnection of the input and output circuits, I supply the two sections of the amplifier through an isolating transformer having a core 20, a primary winding 21, and two secondary windings 22L, 22R respectively.

It will be apparent to those skilled in the art that the action of the arrangement of Fig. 2 will be such that when input is applied of such polarity that 18L is positive and 18R is negative, the left hand section of the magnetic amplifier, of which the input winding is 3L, will have positive feed-back; whereas the right hand section of the magnetic amplifier of which the input winding is 3R will have negative feed-back.

Under these conditions the left hand output circuit 15L will be energized but no current will be supplied to the right hand output circuit 15R.

I wish particularly to point out that, this effect is brought about almost entirely by selective energization of the windings 3L, 3R and is to a minimum extent affected by, or dependent upon, the electrical characteristics of the saturating reactors, transformers, resistances, rectifiers, etc.

It is important to note that the selective action produced is not merely the expected result of the separate actions of two amplifier circuits in accordance with Fig. 8 of my co-pending application; nor is it simply the sum of the results contributed by the two circuits. The feed-back action is very much more selective when the two input windings 3L, 3R, are connected in parallel, inasmuch as the amplifier circuit, in respect of which positive feed-back obtains, tends to cause substantially all of the signal current to flow in the input winding of the saturating reactor of that amplifier, as a result of which it is possible to obtain a condition substantially the same as that shown in Fig. 1. That is to say, with a signal of one polarity one input winding is energized and the other substantially deenergized, this energy relationship with reference to 3L and 3R being reversed when the input polarity is reversed.

Thus there is a joint or co-operative action between the two magnetic amplifier circuits of a distinctive character which does not occur when either of said circuits are operating individually and separately.

This arrangement is responsive to input power levels substantially less than that shown in Fig. 1.

Figure 3:
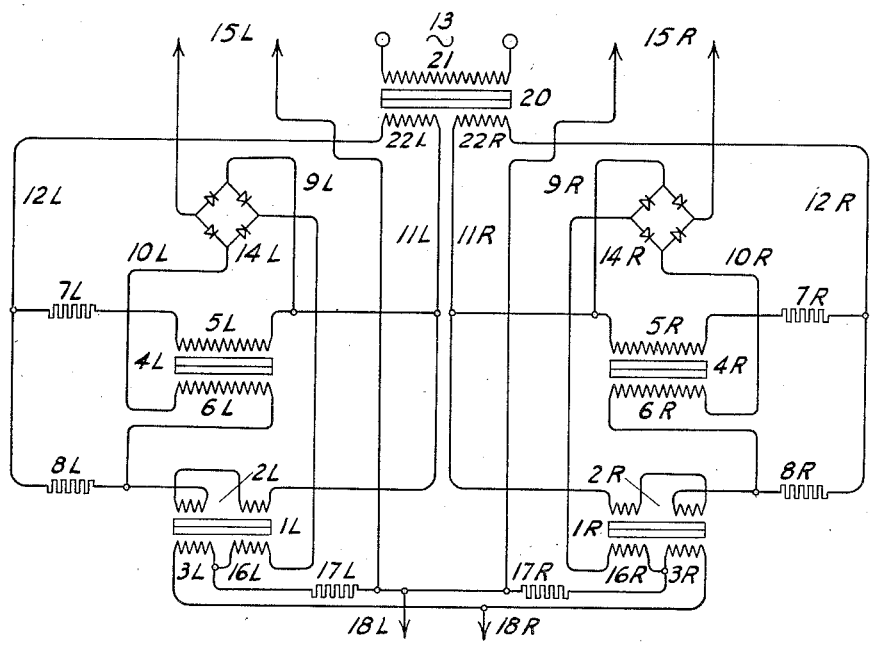
Fig. 3 is a diagram illustrating a modification of the embodiment of my invention shown in Fig. 2.
Figure 7:
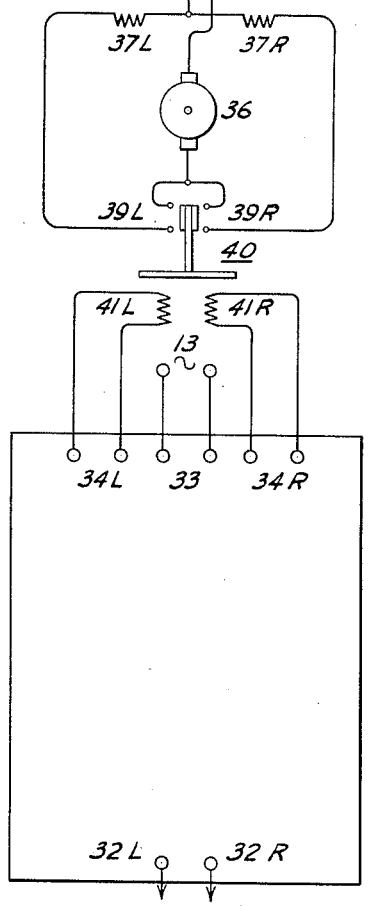
Figs. 7 and 8 are electrical circuit diagrams showing applications of the embodiment of my invention illustrated in Fig. 6.

In Fig. 3 I show an arrangement similar to Fig. 2 but in which I have included, in addition, feed-back windings, as in Fig. 7 of my above cited co-pending application, Serial No. 666,867.

These windings which I have designated by like identifying numerals 16L, 16R improve the operation of my invention.

In order to simplify the drawing I have transposed the order of series connection of the input winding 3R and the feed-back resistor 17R so as to avoid crossing of conductors in the diagram. For the same reason the sense of the rectifier 14R is reversed. But no change in operation or function is thereby entailed.

It is to be noted that fed-back windings 16L, 16R, as shown in the diagram, should be connected additively with reference to the action of their associated feed-back resistors 17L, 17R.

While this selective action in accordance with the D. C. polarity of the input is very marked, it is somewhat limited in its range of operability. That is to say, the constants of the circuit may be adjusted to give definite selectivity for any given input magnitude; but there is a tendency towards imperfect action at other input levels. For example, if the circuit is adjusted for best operation at low input levels it will tend to operate less effectively at high inputs. Conversely it can be set so as to give very definite selectivity with high input levels. But when so arranged it will not function so well with low values of input.

In systems of the type hereinbefore described in connection with which the use of the present invention is contemplated it is an inherent condition that the input levels at which normal action is required are of a low order; that is to say, a high sensitivity is essential. On the other hand, conditions, not existing in normal action, but not entirely avoidable, may occur as a result of which, relatively, very high input levels may occur.

Consider for example, any representative type of self-balancing bridge or servo-mechanism such as for example, the arrangement in my U. S. Patent No. 2,277,849. In such applications it may reasonably be required that the system be maintained in a condition of balance within, say, one per cent, at least, of its full range of operation. From this it follows that the input power level at which the magnetic amplifier is desired to be operative will be less than one ten-thousandth of the power level at which the bridge is energized.

If, as may well be the case, there are limiting conditions, as for example, temperature rise, tending to restrict the power dissipation in the bridge to magnitudes of the order of a few watts or less, it will readily be apparent that the power delivered to the magnetic amplifier for one per cent out-of-balance will be of a very low order.

On the other hand, conditions can occur, as for example, following a temporary failure of the power source, in which the whole system may be energized with the bridge in the extreme condition of out-of-balance as a result of which power levels of the order of 10,000 times the desired minimum response level can occasionally be applied to the input.

Under such condition the limitations of an arrangement such as that shown in Fig. 2 would become apparent in the following manner.

Supposing that a very high input be applied to conductors 18L, 18R such that the former is positive and the latter negative. Under this condition, output circuit 15L would receive substantial output. While it would be desired that output circuit 15R should be entirely unaffected by an input of this polarity, if the input attain a sufficiently high level some output current might commence to appear in 15R. Since it is contemplated that the outputs of 15L, 15R are to energize further stages of amplification, even low values of output on the side with respect to which no effect is desired, are inadmissible.

Figure 4:
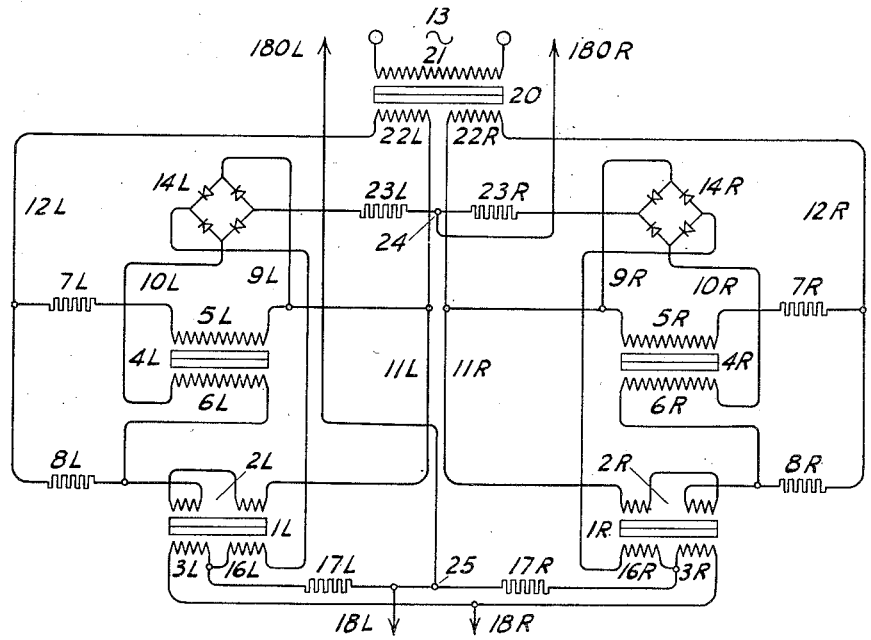
Fig. 4 is a diagram showing a further embodiment of my invention.
Figure 6:
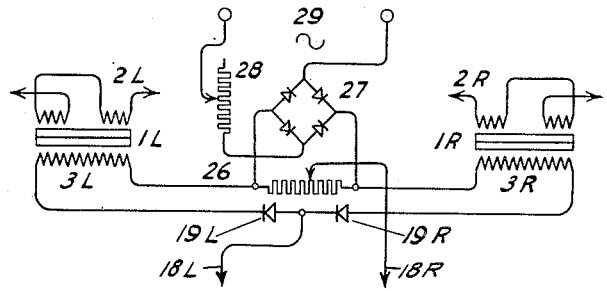
Fig. 6 is a diagram representing a two-stage magnetic amplifier based upon the arrangement shown in Figs. 1, 4 and 5.

I therefore show in Figs. 4, 5, and 6, structure which accomplishes the desired object. That is to say, a magnetic amplifier capable of polarized response, high sensitivity, and capable of correct operation over a wide range of input levels.

In Fig. 4, I show an arrangement substantially similar to Fig. 3 except in respect of the manner in which the outputs of the rectifiers 14L, 14R are connected. Instead of the two separate output circuits 15L, 15R, I connect the output circuits of the rectifiers 14L, 14R additively in series, including in this series circuit two resistors of like value, 23L, 23R. This series circuit therefore includes the direct current connections of the rectifiers 14L, 14R, the resistors 23L, 23R, the feed-back windings, 16L, 16R, and portions of the input circuit including the feed-back resistors 17L, 17R. In Fig. 4, I show a junction point 24 between 23L and 23R, and another junction point 25 between 17L and 17R. To these junction points I connect conductors 180L and 180R.

It will be apparent to those skilled in the art that with this method of connection, when the rectified currents delivered by 14L, 14R are exactly equal 24 and 25 will be equi-potential points and no output will be delivered by conductors 180L, 180R.

If, however, the output of 14R be greater than that of 14L, which condition, it will be noted, occurs when the conductor 18R is positive, then 24 will become positive with relation to 25. Thus conductor 180R will become positive with respect of 180L. If, on the other hand, input is applied to 18L, 18R, such that 18L is positive then, in like manner 180L will become positive with respect to 180R.

It is to be noted that with this arrangement, if a very high input be applied to the magnetic amplifier, such that, as described above, there may be some small output current in respect of the side where none is desired, the conductors 180L and 180R will still deliver output of the correct polarity. This is because the conductors 180L, 180R are energized in accordance with the difference between the left and right hand elements of the magnetic amplifier; and, even if there is some small undesired current on one side, the current on the other side is very much greater.

The amplifying action of an arrangement as shown in Fig. 4 is such that the power level is stepped up to an extent that if an input applied to 18L, 18R be of a magnitude not applicable to the arrangement shown in Fig. 1, that is to say, there would not be sufficient voltage to cause 19L, 19R to become conducting, nevertheless, the output delivered by 180L and 180R would be of sufficient magnitude. I may therefore connect conductors 180L, 180R to a second stage of magnetic amplification in accordance with Fig. 1, with entirely effective results.

I show in Fig. 5 an arrangement which permits of an improvement in the action of the half-wave rectifiers 19L, 19R as described in reference to Fig. 1.

Referring to these half-wave rectifying elements, it is known to those skilled in the art that such contact rectifiers as are now available are neither perfect conductors in the forward direction nor perfect insulators in the reverse direction. The merit of a contact rectifier inheres in the ratio of the resistances in the forward and reverse directions. I have found that rectifiers of the copper oxide type, such as are currently available, when used in the arrangement shown in Fig. 1, will furnish a sensitivity of several microwatts; but with high values of input their conductivity in reverse direction becomes appreciable. I find that rectifiers of the selenium type have a much better ratio of direct and reverse conductivity and even with high input power levels they are superior in respect of reverse conductivity. However, the forward conductivity of the copper oxide rectifier is better than that of the selenium type. That is to say, a high value of input voltage is necessary before the selenium type rectifier becomes effectively conducting. Thus, if a selenium type rectifier be used the amplifier will require an input of from 20 to 50 microwatts before any substantial gain is developed.

In Fig. 5 I show a resistor 26 included in the connections to the input windings 3L, 3R. I connect the input conductor 18R to the mid-point of the resistor 26. Thus an input current supplied through 18R to 3L or 3R flows in opposite sense through the two sections of 26. Direct current from any convenient source, as for example, rectifier 27, energized through a resistor 28, from an A. C. source 29, is caused to flow in the resistor 26. The polarity of this direct current as shown in Fig. 5 is such that the E. M. F.'s set up thereby in the two sections of 26 are additive in respect of conductivity in the forward direction of 19L, 19R respectively.

The effect of this arrangement is two-fold. The value of the resistor 28 is so adjusted that, when there is no input applied to 18L, 18R, no substantial flow of current takes place in 3L, 3R. However, when such an input is applied, because of the voltages initially present, due to 26, in this circuit substantially less input applied to 18L, 18R will give rise to appreciable current in 3L, 3R. In one such arrangement which I have constructed the use of this feature reduced the minimum effective power level from about 50 microwatts to substantially less than 10 microwatts.

Furthermore, in addition to this effect, when an input of a high power level such that incidence of reverse conductivity in 19L or 19R may become apparent, it will be noted that the E. M. F. in the section of 26 which is in series with the rectifier with respect to which reverse conductivity is in question, is in opposition to the reverse conductivity. This tends to suppress the reverse conductivity.

Thus the arrangement of Fig. 5 both improves the sensitivity and increases the range of effective operation.

By making the connection between 18R and the mid-point of 26 adjustable, if it be desired to predispose the action of the amplifier in one direction or the other, this may be accomplished by varying the position of this connection so as to produce the desired result.

In Fig. 6, I show a complete magnetic amplifier unit 35 comprising an assembly of the structure disclosed in Figs. 1, 4, and 5.

In the figure I show a pair of input binding posts 32L, 32R to which the input conductors 18L, 18R of a first stage substantially identical with the arrangement shown in Fig. 4, are connected. I show also a second stage substantially in accordance with Fig. 1, and two pairs of binding posts, 34L, 34R to which the output circuits 15L, 15R are connected.

Included between the output conductors 180L, 180R of the first stage and the input windings 3L, 3R of the second stage I show the resistor 26 and the associated structure disclosed in Fig. 5.

I show also a pair of binding posts 33 for receiving the A. C. supply to the magnetic amplifier. Conductors 11L, 12L, 11R, 12R are connected to the binding posts 33 as is also the primary winding 21 of the isolating transformer for supplying the second stage. I provide the isolating transformer with an additional secondary winding 30 connected, as shown in the drawing, to supply the rectifier 27.

In cases where exceptionally high input power levels may be encountered, I may include, connected across the binding posts 32L, 32R, a limiter 31. This latter feature by itself will not be sufficient to protect the magnetic amplifier from the effects of high input levels since such a device does not commence to become conducting to a substantial extent until a relatively high voltage is applied to the binding posts 32L, 32R. For this reason, the other arrangements hereinbefore disclosed are desirable. However, if sufficiently high power levels are reached the use of the limiter 31 may be an additional advantage.

While I have shown in Fig. 6 only one additional neutral type stage of amplification following the first stage, it is to be clearly understood that one or more additional stages connected between the output circuits 15L, 15R and the binding posts 34L, 34R, as shown in Fig. 6 of my co-pending application, Serial No. 666,867, may be included.

I show in Figs. 7 and 8 the manner of use of the magnetic amplifier assembly 35.

In Fig. 7 I show arrangements appropriate for the control of a direct current motor and in Fig. 8 the arrangements which may be used for an alternating current motor.

In Fig. 7 I show a motor of the split-series type having an armature 36, field windings 37L, 37R, energized from a source 38 through contacts 39L, 39R of a relay 40 having coils 41L, 41R. The coils 41L, 41R are connected respectively to binding posts 34L, 34R.

The action of my invention is as follows.

With no input applied to the binding posts 32L, 32R, the currents in both 41L and 41R will be inappreciable. If input be now applied to the amplifier of such polarity that binding post 32R is positive, substantial current will flow in the relay coil 41R. But there will be no effect at all in respect of 41L. Accordingly the relay will close contacts 39R and the motor will rotate in the desired direction.

Conversely if the input polarity be reversed, the current will flow in 41L but not in 41R and the motor will rotate in the opposite direction.

I wish particularly to point out that with this structure, as distinguished from arrangements of the prior art, there is no feature or function of comparison or mechanical balance between the excitation of 41L, 41R. If desired, two separate relays could be used instead of the type shown in the drawing without any difference in the operation of my invention. In Fig. 7, I have shown the relay 40 in accordance with conventional practice in the art. It is well known that when a reversing motor is to be controlled by a contact device the contacts should be mechanically interlocked in case of sticking or welding of the contacts.

In Fig. 8, I show a similar arrangement for controlling a motor of the alternative current induction type having a rotor 42, windings 43L, 43R, and a capacitor 44, energized from an A. C. source 45.

The motor windings are energized in series with A. C. windings 200L, 200R of a pair of saturating reactors having cores 100L, 100R preferably of the type shown in Fig. 3 of my co-pending application Serial No. 666,867.

These two control reactors have D. C. saturating windings 300L, 300R connected respectively to binding posts 34L, 34R of the magnetic amplifier 35.

The action of the arrangement shown in Fig. 8 is similar to that already described in reference to Fig. 7. According to the polarity of the D. C. input applied to binding posts 32L, 32R, one of the saturating windings 300L or 300R is, selectively, energized, the other remaining unaffected.

While the two saturating reactors in Fig. 8 may be included in the magnetic amplifier assembly 35, I prefer to provide them in the form of separate units. Thus the magnetic amplifier assembly 35 may without change be utilized either for the purpose of Fig. 7 or for an arrangement according to Fig. 8. Furthermore, where an alternating current motor is controlled by saturating reactors in the manner shown in Fig. 8 there is necessarily a cognate relationship between the type of motor used and the number of turns in the A. C. windings 200L, 200R. Thus, in the arrangement shown, different types of control saturating reactors for operation with motors of different voltages or different types may be employed without changing the structure of the magnetic amplifier circuit 35.

In order better to illustrate the action of this circuit, I give below some typical numerical values taken from a practical embodiment of my invention which I have constructed and tested. It should, however, be clearly understood that my invention may be carried into effect on any desired scale of magnitude and may be modified in any manner conformable with the purpose and application for which it is to be employed. I am, therefore, in no way to be limited by the following data which is included only for the purpose of facilitating the understanding of my invention.

In the aforementioned embodiment comprising three stages, all of the stages had cores, consisting of approximately 0.75" stacking of 3 limb laminations of proportions similar to that shown in Fig. 2 of my aforementioned co-pending application Serial No. 666,867 having overall dimensions approximately 2.88" by 2.69" wide. The center limb was 0.75" and the two outside limbs were 0.438" wide. The stamping had a window area of 1.13 square inches. The laminations for the first stage were made from a nickel-iron alloy containing more than 70 per cent of nickel. The cores of the second and third stages were made from a nickel-iron alloy containing 50 per cent or less of nickel. The cores 4 of the transformers 4, 5, 6, of all of the stages were constructed of 0.75" stacking of laminations 1.88" x 1.56" wide made of conventional transformer core material.

The resistance of the input circuit at terminals 32L, 32R was of the order of 100 ohms and with suitable windings and resistance values an input of 50 microamperes corresponding to a power level of approximately ¼ of a microwatt caused a current of 20 milli-amperes to flow in the circuit connected to 34L or 34R in accordance with the polarity of the input. In this case the resistance of the circuits supplied by 34L, 34R was also of the order of 100 ohms. Thus the power level of the output was approximately 40 milliwatts.

Effective selective action was maintained with input power levels exceeding ten thousand times the minimum response value.

Although I have chosen a particular embodiment of my invention for the purpose of explanation, many modifications thereof will be apparent to those skilled in the art to which it pertains. My invention, therefore, is not to be limited except in so far as is necessitated by the prior art and the spirit of the appended claims.

What I claim as new and desire to secure by Letters Patent of the United States is:

1. In combination, a magnetic amplifier system comprising a first stage consisting of a pair of magnetic amplifiers each having an input circuit and an output circuit, a direct current source of reversible polarity and means for causing said input windings to receive unequal energization from said source in accordance with the polarity of said source, means connecting said output circuit in additive sense in series, and means connecting normally equi-potential junction points between said output circuits for deriving from said junction points direct current output of reversible polarity in accordance with the polarity of said source, together with a second stage consisting of a further pair of magnetic amplifiers each having a direct current input winding in a series circuit with boundary layer rectifying means and an output circuit, means connecting the series circuits of said D. C. input windings in parallel to said junction points, for causing said last-mentioned input windings to receive unequal energization from said junction points in accordance with the polarity derived from said junction points.

2. Apparatus of claim 1 comprising means for improving the selective action with reference to the polarity of said junction points consisting of means for introducing in series with each of the direct current input windings which are connected to said junction points, a direct current E. M. F. in the same direction as that of forward flow in said boundary-layer rectifying means.

3. A pair of magnetic amplifiers each having an output circuit and a series input circuit comprising a saturable core device having a direct current input winding and a half-wave rectifier connected in series with said input winding, and means for connecting said series circuits in parallel to a direct current source of reversible polarity for causing said input windings to receive unequal energization from said source in accordance with the polarity of said source.

4. A pair of magnetic amplifiers each having an output circuit and an input circuit comprising a saturable core device having a direct current input winding, means for connecting said input circuits in parallel to a direct current source of reversible polarity, and means for interconnecting said input and output circuits for causing said input windings to receive unequal energization from said source in accordance with the polarity of said source.

5. A pair of magnetic amplifiers each having an output circuit and an input circuit comprising a saturable core device having a direct current input winding, means for connecting said input circuits in parallel to be energized from a direct current source of reversible polarity, and means for energizing said input circuits from the output circuits of said magnetic amplifiers whereby each of said windings receives a feedback effect of different polarity according to the polarity of said source for causing said input windings to receive unequal energization from said source in accordance with the polarity of the source.

6. A pair of magnetic amplifiers each having an output circuit and an input circuit comprising a saturable core device having a direct current input winding, means for connecting said input circuits in parallel to be energized from a direct current source of reversible polarity, and means for energizing said input circuits from the output circuits of said magnetic amplifiers whereby when said source is of one polarity one of said input windings receives positive feed-back and the other of said input windings receives negative feed-back and when said source is of the opposite polarity said first mentioned input winding receives negative feed-back and said second mentioned input winding receives positive feed-back, for causing said input windings to receive unequal energization from said source in accordance with the polarity of said source.

7. A pair of magnetic amplifiers each comprising: a saturable core device having an alternating current winding and a direct current input winding, a half-wave rectifier connected in series with said direct current winding, a first impedance, means for connecting said first impedance in series with said alternating current winding across an alternating current source, a transformer having primary and secondary windings, a second impedance connected in series with said primary winding across said alternating current source, an output circuit arranged to be energized responsive to flow of current in said alternating current winding, and means for connecting said secondary winding and said alternating current winding in series with each other and with said output circuit; and means for connecting said series connected rectifier and direct current winding of one amplifier and said series connected rectifier and direct current winding of the other amplifier in parallel to a direct current source of reversible polarity whereby said direct current windings receive unequal energization from said direct current source in accordance with the polarity thereof.

8. A pair of magnetic amplifiers each comprising: a saturable core device having an alternating current winding and a direct current input winding, a first impedance, means for connecting said first impedance in series with said alternating current winding across an alternating current source, a transformer having primary and secondary windings, a second impedance connected in series with said primary winding across said alternating current source, an output circuit arranged to be energized responsive to flow of current in said alternating current winding, and means for connecting said secondary winding and said alternating current winding in series with each other and with said output circuit; means for connecting said input windings in parallel to a direct current source of reversible polarity; and means energized from said output circuits for causing said input windings to receive unequal energization from said direct current source in accordance with the polarity thereof.

9. A multi-stage magnetic amplifier system comprising: a first stage comprising a pair of magnetic amplifiers each containing: a saturable core device having an alternating current winding and a direct current input winding, feedback means connected in series with said input winding, a first impedance, means for connecting said first impedance in series with said alternating current winding across an alternating current source, a transformer having primary and secondary windings, a second impedance connected in series with said primary winding across said alternating current source, an output circuit arranged to be energized responsive to flow of current in said alternating current winding, and means for connecting said secondary winding and said alternating current winding in series with each other and with said output circuit, and means for interconnecting said output circuit and said feed-back means; means for connecting said series connected feed-back means and direct current winding of one amplifier and said series connected feed-back means and direct current winding of the other amplifier in parallel to a direct current source of reversible polarity whereby said input windings receive unequal energization from said direct current source in accordance with the polarity thereof; and a second stage comprising a further pair of magnetic amplifiers each having a direct current input winding and an output circuit and means connecting said first stage with said second stage.

10. A pair of magnetic amplifiers each comprising: a saturable core device having an alternating current winding and a direct current input winding, feed-back means connected in series with said input winding, a first impedance, means for connecting said first impedance in series with said alternating current winding across an alternating current source, a transformer having primary and secondary windings, a second impedance connected in series with said primary winding across said alternating current source, an output circuit arranged to be energized responsive to flow of current in said alternating current winding, and means for connecting said secondary winding and said alternating current winding in series with each other and with said output circuit, means for connecting said series connected feed-back means and direct current winding of one amplifier and said series connected feed-back means and direct current winding of the other amplifier in parallel to a direct current source of reversible polarity; and means interconnecting said output circuits with said feed-back means whereby when said direct current source is of one polarity one of said input windings receives positive feed-back and the other of said input windings receives negative feed-back and when said direct current source is of the opposite polarity said one input winding receives negative feed-back and said other input winding receives positive feed-back for causing said input windings to receive unequal energization from said direct current source in accordance with the polarity thereof.

11. A pair of magnetic amplifiers each comprising: a saturable core device having an alternating current winding and a direct current input winding, a first impedance, means for connecting said first impedance in series with said alternating current winding across an alternating current source, a transformer having primary and secondary windings, a second impedance connected in series with said primary winding across said alternating current source, an output circuit arranged to be energized responsive to flow of current in said alternating current winding, and means for connecting said secondary winding and said alternating current winding in series with each other and with said output circuit; and means for causing said input windings to receive unequal energization from a direct current source of reversible polarity comprising a plurality of means for developing voltages of predetermined fixed polarity and means for connecting one of said input windings in series with one of said developing means to said direct current source and means for connecting the other of said input windings in series with another of said developing means to said direct current source.

12. A pair of magnetic amplifiers each comprising: a saturable core device having an alternating current winding and a direct current input winding, unilaterally conducting means connected in series with said input winding, a first impedance, means for connecting said first impedance in series with said alternating current winding across an alternating current source, a transformer having primary and secondary windings, a second impedance connected in series with said primary winding across said alternating current source, an output circuit arranged to be energized responsive to flow of current in said alternating current winding, and means for connecting said secondary winding and said alternating current winding in series with each other and with said output circuit; and means for connecting said series connected unilaterally conducting means and direct current winding of one amplifier and said series connected unilaterally conducting means and direct current winding of the other amplifier in parallel to a direct current source of reversible polarity whereby said direct current windings receive unequal energization from said direct current source in accordance with the polarity thereof.

ALAN S. FITZ GERALD.

REFERENCES CITED

The following references are of record in the file of this patent:

UNITED STATES PATENTS

| Number | Name | Date |
|---|---|---|
| 1,704,736 | Geiger | Mar. 12, 1929 |
| 1,914,220 | Sorensen et al. | June 13, 1933 |
| 2,277,849 | Fitzgerald | Mar. 31, 1942 |
| 2,338,423 | Geyger | Jan. 4, 1944 |
| 2,414,936 | Edwards et al. | Jan. 28, 1947 |